(12) United States Patent
Yoshida (10) Patent No.: US 6,285,241 B1
(45) Date of Patent: Sep. 4, 2001

(54) INTERNAL VOLTAGE BOOSTING CIRCUIT

(75) Inventor: Souichirou Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/421,325

(22) Filed: Oct. 18, 1999

(30) Foreign Application Priority Data

Oct. 20, 1998 (JP) ............................. 10-297854

(51) Int. Cl.$^7$ .................................................. G05F 1/10
(52) U.S. Cl. ........................................................ 327/536
(58) Field of Search .................. 327/390, 534, 327/535, 536

(56) References Cited

U.S. PATENT DOCUMENTS

| | | | |
|---|---|---|---|
| 5,561,385 | * 10/1996 | Choi | 327/536 |
| 5,818,289 | * 10/1998 | Chevallier | 327/536 |
| 5,936,459 | * 8/1999 | Hamamoto | 327/536 |
| 6,008,690 | * 12/1999 | Takeshima et al. | 327/534 |

FOREIGN PATENT DOCUMENTS

| | | |
|---|---|---|
| 5-189970 | 7/1993 | (JP). |
| 8-50788 | 2/1996 | (JP). |
| 9-139077 | 5/1997 | (JP). |

\* cited by examiner

*Primary Examiner*—Jeffrey Zweizig
(74) *Attorney, Agent, or Firm*—Sughrue, Mion, Zinn, Macpeak & Seas, PLLC (57) ABSTRACT

An internal voltage boosting circuit has an oscillator circuit that generates a signal of a prescribed frequency under the control of an oscillator control signal and a stepped-up voltage generating circuit that inputs the signal output by the oscillator circuit and outputs a prescribed stepped-up voltage. In the stepped-up voltage generating circuit, in order to prepare for a next voltage boosting operation, one end of a voltage boosting capacitance is connected to one end of a voltage boosting capacitance of another voltage boosting circuit that operates with a phase difference of 180 degrees, the accumulated charge therein being re-used, after which return is made to the ground potential so as to achieve a voltage boosting to a prescribed stepped-up voltage.

10 Claims, 5 Drawing Sheets

INTERNAL VOLTAGE BOOSTING CIRCUIT

BACKGROUND OF THE INVENTION

1. Field of the Invention

The present invention relates to an internal voltage boosting-up circuit, and more particularly to an internal voltage boosting-up circuit that generates an internally boosted voltage in a semiconductor storage device.

2. Background of the Invention

In the past, in order to achieve stable and efficient reading and writing of memory cell data in a semiconductor memory device, an internal voltage boosting circuit was provided to raise the potential on a word line connected to an n-channel MOS transistor of a memory cell to a voltage that is greater than the externally supplied power supply voltage.

Figure 1:
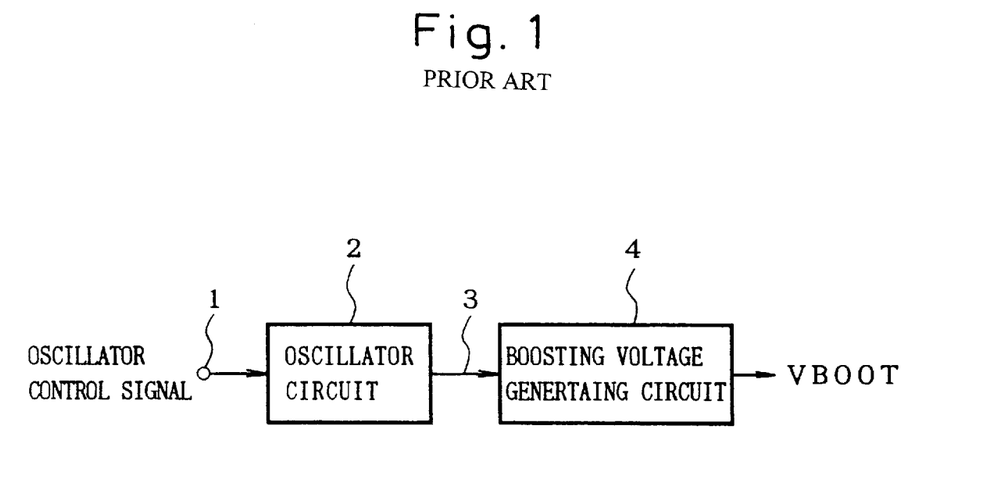
FIG. 1 is a block diagram showing the configuration of a general internal voltage boosting circuit.

FIG. 1 is a block diagram showing the configuration of a general internal voltage boosting-up circuit.

As shown in FIG. 1, a general voltage boosting circuit is formed by an oscillator circuit 1 to which is input an oscillator control signal 1 and which generates a signal having a prescribed frequency, and an boosted voltage generating circuit 4 which inputs the oscillation signal output of the oscillator circuit 2 and outputs a stepped-up voltage VBOOT.

Figure 4:
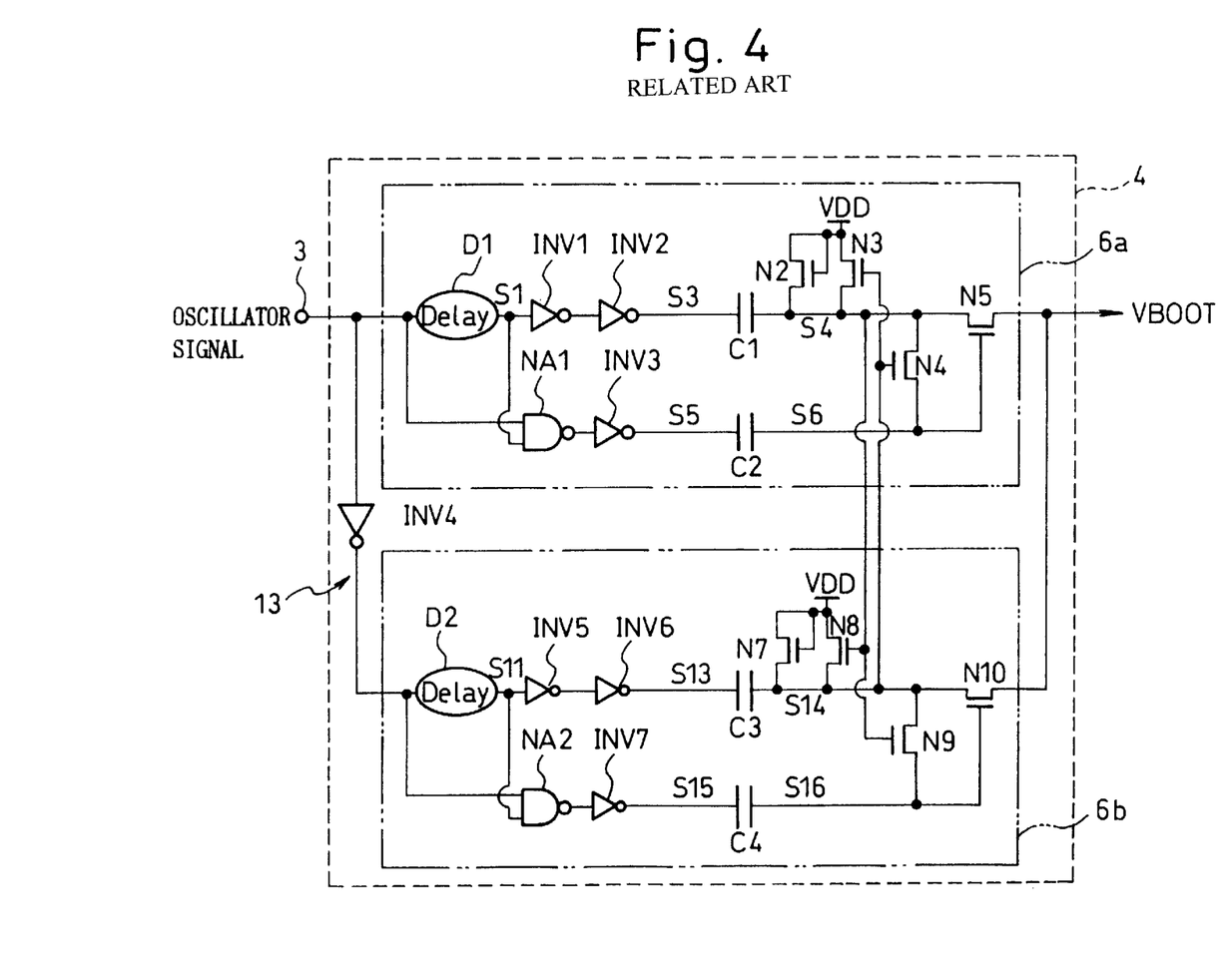
FIG. 4 is a drawing that shows a specific configuration of the boosted voltage generating circuit, illustrating an example of related art.

FIG. 4 is a drawing that shows a specification configuration of a boosted voltage generating circuit shown in FIG. 1, provided for the purpose of describing an example of such a circuit in the related art.

As shown in FIG. 4, the boosted voltage generating circuit 4 has two voltage boosting circuits, 6a and 6b.

The first voltage boosting circuit 6a has a delay element D1, to which an oscillator signal 3 is input, the output (node S1) of which is delayed by tD1, an inverter INVL for inverting the output of the delay element D1, an inverter INV2 for inverting the output of the inverter INV1, a capacitance C1, one end of which is connected to the output (node S3) of the inverter INV2, and the other end of which is connected to a node S4, an NMOS transistor N2, the source and gate of which are connected to the power supply VDD, and the drain of which is connected to the node S4, an NMOS transistor N3, the source of which is connected to the power supply VDD, the drain of which is connected to the node S4, and the gate of which is connected to a node S14, an NMOS transistor N4, the source of which is connected to the node S4, the drain of which is connected to a node S6, and the gate of which is connected to the node S14, an NMOS transistor N5, the source of which is connected to the node S4, the drain of which is connected to the voltage boosted line VBOOT, and the gate of which is connected to a node S6, a NAND logic circuit NA1, the oscillator signal 3 and the output of the delay element D1 being connected to the two inputs thereof, an inverter INV3 for inverting the output of the NAND circuit NA1, and a capacitance C2, one end of which is connected to the output of the inverter INV3 (node S5) and the other end of which is connected to the node S6.

The second voltage boosting circuit 6b has exactly the same configuration as the first voltage boosting circuit 6a, with the exception that, whereas the first voltage boosting circuit 6a inputs the oscillator signal 3, the second voltage boosting circuit 6b inputs the inverted oscillator signal /3 (bar 3) from an inverter INV4.

Stated more explicitly, the second voltage boosting circuit 6b has a delay element D2, to which an oscillator signal /3, which is an inverted signal of the oscillation signal 3, is input, the output (node S11) of which is delayed by tD1, an inverter INV5 for inverting the output of the delay element D2, an inverter INV6 for inverting the output of the inverter INV5, a capacitance C3, one end of which is connected to the output (node S13) of the inverter INV6, and the other end of which is connected to a node S14, an NMOS transistor N7, the source and gate of which are connected to the power supply VDD, and the drain of which is connected to the node S14, an NMOS transistor N8, the source of which is connected to the power supply VDD, the drain of which is connected to the node S14, and the gate of which is connected to the node S4, an NMOS transistor N9, the source of which is connected to the node S14, the drain of which is connected to a node S16, and the gate of which is connected to the node S4, an NMOS transistor N10, the source of which is connected to the node S14, the drain of which is connected to the voltage boosted line VBOOT, and the gate of which is connected to the node S16, a NAND logic circuit NA2, the inverted oscillator signal /3 and the output S11 of the delay element D2 being connected to the two inputs thereof, an inverter INV7 for inverting the output of the NAND circuit NA2, and a capacitance C4, one end of which is connected to the output of the inverter INV7 (node S15) and the other end of which is connected to the node S16.

The operation of the voltage boosting circuit 4 shown in FIG. 4 is described below, with reference being made to signal waveform diagrams.

Figure 5:
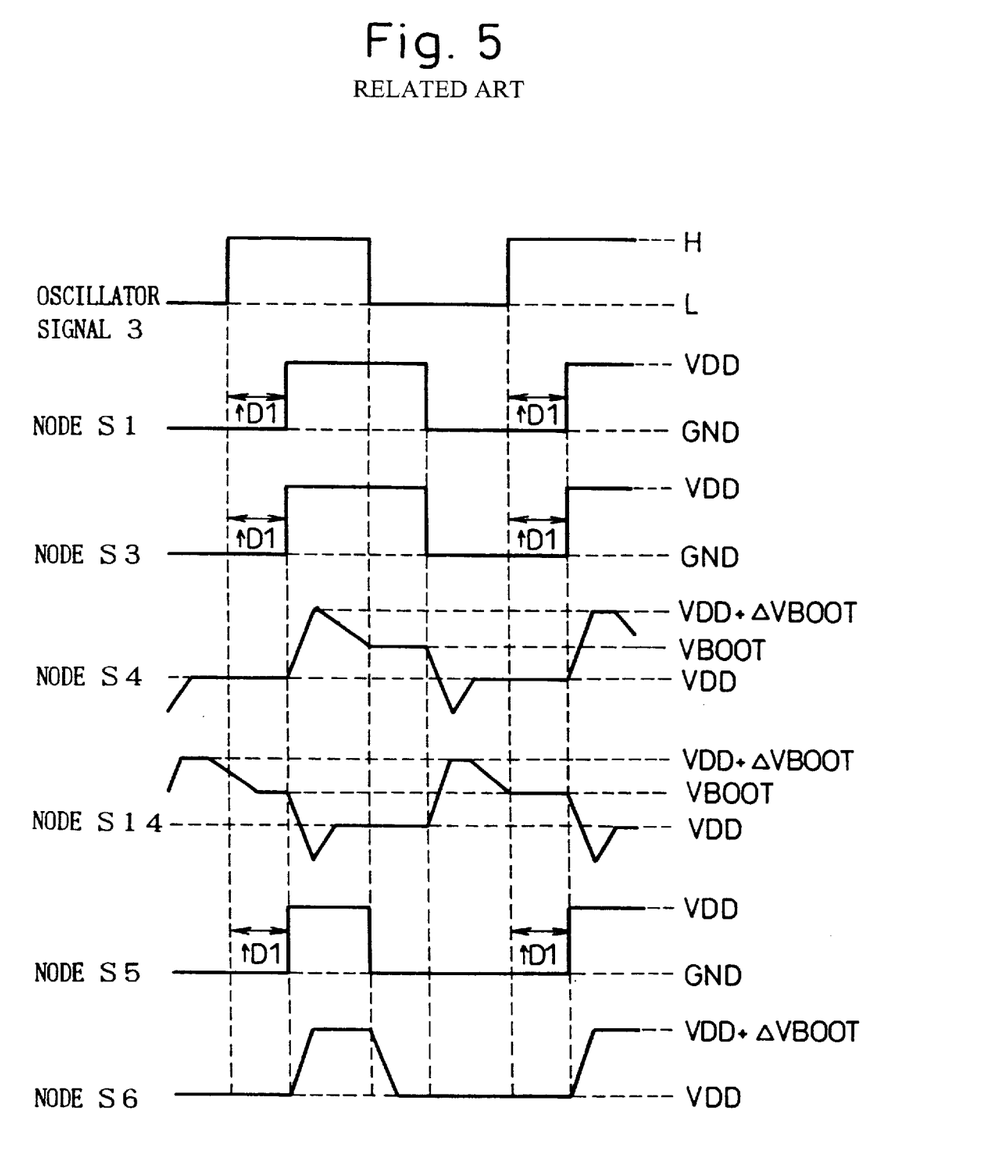
FIG. 5 is a set of potential waveform diagrams of various nodes in the first voltage boosting circuit of a boosted voltage generating circuit in the related art shown in FIG. 4.

FIG. 5 is a set of potential waveform diagrams for various nodes in the first voltage boosting circuit 6a of a boosted voltage generating circuit 4 according to the related art, as shown in FIG. 4.

As shown in FIG. 5, when the oscillator signal 3 is at the low level (L), because the node S14, which is the gate voltage of the NMOS transistors N3 and N4 is at a voltage of (VDD+ΔVBOOT), the NMOS transistors N3 and N4 are in the on condition at this time, so that the nodes S4 and S6 are at the voltage VDD.

When the oscillator signal 3 changes from the low level to the high level (H), the capacitances C1 and C2 are charged with a delay of tD1, in accordance with the delay element D1, so that the voltage at the nodes S3 and S5 change from ground (GND) to VDD. When this occurs, the nodes S4 and S6, which are the other ends of the capacitances C1 and C2, which are in the floating condition, change by the amount Δ VBOOT, according to the law of stored charges. That is, in the case in which the capacitances C1 and C2 are sufficiently larger than parasitic capacitances at the nodes S4 and S6, Δ VBOOT is approximately equal to the changing voltage VDD.

As a result of the increase in potential at the node S6, the NMOS transistor N5 changes to the on condition, so that a charge is transferred from the node S4 to the stepped-up voltage line VBOOT, the stepped-up voltage line VBOOT being thereby biased by the boosted-up voltage VBOOT.

Thus, in an internal voltage boosting circuit 4 of the past, by repeating the voltage waveforms on the nodes S4 and S6 are repeated, so as to generate the internally stepped-up voltage VBOOT.

Because the potentials on the various nodes of the second voltage boosting circuit 6b is the same as those on the nodes of the first voltage boosting circuit 6a, with the only difference being that the phases are reversed, these will not be explicitly described herein.

With recent increased demand for more compact portable electronic equipment, limitations have been placed on power supplies, and it is additionally required that operation over longer periods of time than in the past be achieved within these power supply limitations.

With this operating environment as a backdrop, there is an even further need for a reduction in the power consumption of semiconductor memory devices.

Accordingly, the present invention was made in consideration of the above-noted drawbacks in the related art, and has as an object the provision of an internal voltage boosting circuit that provides the capacity available in the past, while achieving a reduction in power consumption.

SUMMARY OF THE INVENTION

To achieve the above-noted object, the present invention has the following basic technical constitution.

In a first aspect of the present invention, an internal voltage boosting circuit is provided in which the internal voltage boosting circuit comprises a plurality of voltage boosting circuits, voltage boosting capacitances provided in each of said voltage boosting circuits being charged so as to perform voltage boosting operation, wherein a charge that is accumulated in a first voltage boosting capacitance in a first voltage boosting circuit is used in the charging of a second voltage boosting capacitance provided in a second voltage boosting circuit, and in vice versa.

And in the present invention, the first and the second voltage boosting circuits of the internal voltage boosting circuit are preferably driven respectively with a phase difference of 180 degrees from each other.

Further in the present invention, a one end terminal of the first voltage boosting capacitance is connected to one end of terminal of the second voltage boosting capacitance, via a switching means so that at least a part of charge accumulated in one of the first and second voltage boosting capacitances is transferred into an opposite voltage boosting capacitance in response to an operation of the switching means.

In the present invention, the switching means may be driven with an oscillating signal input into the first and second voltage boosting circuit.

On the other hand as a second aspect of the present invention, the present invention specifically provides an internal voltage boosting circuit having an oscillator circuit to which is input an oscillator control signal and which generates a signal having a prescribed frequency, and an internal stepped-up voltage generating circuit which inputs the oscillation signal output of the oscillator circuit and outputs a prescribed boosted voltage, this voltage boosting circuit further having a first delay element, to which an oscillator signal output by the oscillator circuit is input, for the purpose of delaying the output thereof, a first inverter for inverting the output of the first delay element, a second inverter for inverting the output of the first inverter, a first NAND logic circuit, to which the oscillator signal, which is the output of the oscillator circuit, and the output of the first delay element are input, a third inverter for inverting the output of the first NAND logic circuit, a first switching means, one end of which is connected to the output of the second inverter, and which is formed by a first NMOS transistor and a first PMOS transistor that are connected in parallel with each other, a first capacitance, one end of which is connected to the other end of the first switching means, a second capacitance, one end of which is connected to the output of the third inverter, a second NMOS transistor, the source and gate of which are connected to a power supply, and the drain of which is connected to the other end of the first capacitance, a third NMOS transistor, the source of which is connected to a power supply, the drain of which is connected to the other end of the first capacitance, and the gate of which is connected to the other end of a third capacitance, a fourth NMOS transistor, the source of which is connected to the other end of the first capacitance, the drain of which is connected to a stepped-up voltage line, and the gate of which is connected to the other end of the second capacitance, a fifth NMOS transistor, the source of which is connected to the other end of the first capacitance, the drain of which is connected to the boosted voltage line, and the gate of which is connected to the other end of the second capacitance, a fourth inverter for inverting the oscillator signal, which is the oscillation output signal of the oscillator circuit, a second delay element, to which the output of the fourth inverter is input, for the purpose of delaying the output thereof, a fifth inverter for inverting the output of the second delay element, a sixth inverter for inverting the output of the fifth inverter, a second NAND logic circuit, to which the output of the fourth inverter and the output of the second delay element are input, a seventh inverter for inverting the output of the second NAND logic circuit, a second switching means, one end of which is connected to the output of the sixth inverter, and which is formed by a sixth NMOS transistor and a second PMOS transistor, a third capacitance, one end of which is connected to the other end of the second switching means, a fourth capacitance, one end of which is connected to the output of the seventh inverter, a seventh NMOS transistor, the source and gate of which are connected to a power supply, and the drain of which is connected to the other end of the third capacitance, an eighth NMOS transistor, the source of which is connected to a power supply, the drain of which is connected to the other end of the third capacitance, and the gate of which is connected to the other end of the first capacitance, a ninth NMOS transistor, the source of which is connected to the other end of the third capacitance, the drain of which is connected to a boosting voltage line, and the gate of which is connected to the other end of the fourth capacitance, a tenth NMOS transistor, the source of which is connected to the other end of the third capacitance, the drain of which is connected to the boosting voltage line, and the gate of which is connected to the other end of the fourth capacitance, a third NAND logic circuit, to which are input the oscillator signal, which is an output signal of the oscillator circuit, and the output of the second delay element, a fourth NAND logic circuit, to which are input the output of the fourth inverter and the output of the first delay element, a fifth NAND logic circuit, to which are input the output of the third NAND logic circuit and the output of the fourth NAND logic circuit, the output of the fifth NAND logic circuit being connected to the gates of the first and second PMOS transistors, an eighth inverter for inverting the output of the fifth NAND logic circuit, the output of the eighth inverter being connected to the gates of the first and sixth NMOS transistors, and an eleventh NMOS transistor, the source of which is connected to one end of the first capacitance, the drain of which is connected to the other end of the third capacitance, and the gate of which is connected to the output of the fifth NAND logic circuit.

DESCRIPTION OF THE PREFERRED EMBODIMENTS

Preferred embodiments of the present invention are described below in detail, with references being made to relevant accompanying drawings.

Figure 2:
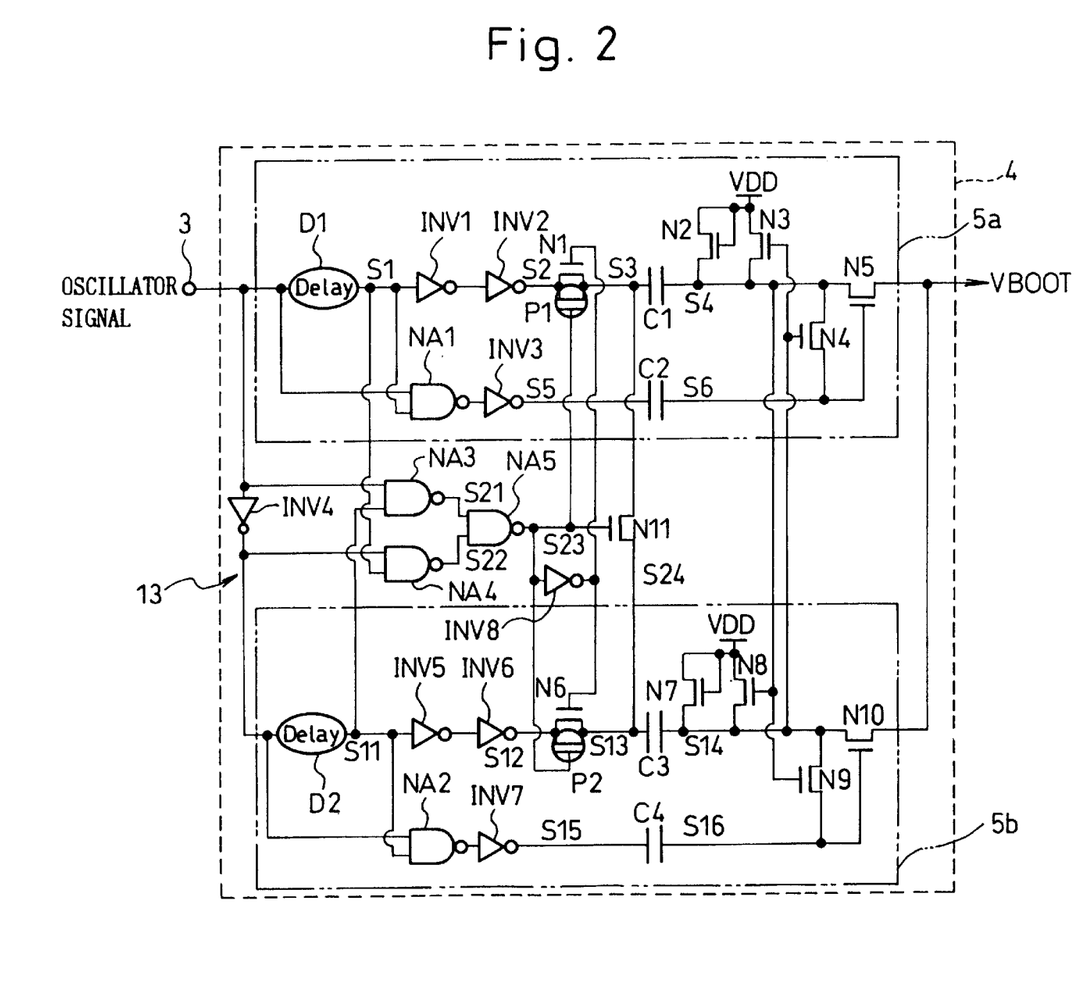
FIG. 2 is a drawing that shows a specific configuration of the voltage boosting circuit shown in FIG. 1, illustrating the first embodiment of the present invention.

FIG. 2 shows a specific configuration of the boosted-up voltage generating circuit of FIG. 1, thereby illustrating an embodiment of the present invention.

As shown in FIG. 2, a stepped-up voltage generating circuit 4 according to an embodiment of the present invention has a first voltage boosting circuit 5a and a second voltage boosting circuit 5b.

Further, as shown in FIG. 2, the stepped-up voltage generating circuit 4 has a first delay element D1, to which an oscillator output signal 3 that is the oscillation signal output by the oscillator circuit 2 of FIG. 1 is input, for the purpose of delaying the output thereof, a first inverter INV1 for inverting the output of the first delay element D1 (node S1), a second inverter INV2 for inverting the output of the first inverter INV1, a first NAND logic circuit NA1, to which the oscillator signal 3, which is the oscillation output of the oscillator circuit 2, and the output of the first delay element, a third inverter for inverting the output of the first NAND logic circuit NA1, a first switching means connected for switching between the output of the second inverter INV2 (node S2) and a node S3, which is controlled by the outputs from a fifth NAND logic circuit and an eighth inverter INV8, and which is formed by a first NMOS transistor N1 and a first PMOS transistor P1 that are connected in parallel with each other, a first capacitance C1, one end of which is connected to the node S3 and other end of which is connected to the node S4, a second capacitance C2, the one end of which is connected to the output of the third inverter INV3 (node S5), a second NMOS transistor N2, the source and gate of which are connected to a power supply VDD, and the drain of which is connected to the other end of the first capacitance C2 (node S4), a third NMOS transistor N3, the source of which is connected to a power supply VDD, the drain of which is connected to the node S4, and the gate of which is connected to the other end of a third capacitance C3 (node S14), a fourth NMOS transistor N4, the source of which is connected to the node S4, the drain of which is connected to the node S6, and the gate of which is connected to the node S14, a fifth NMOS transistor N5, the source of which is connected to the node S4, the drain of which is connected to the a boosted-up voltage line VBOOT, and the gate of which is connected to the node S6, a fourth inverter INV4 for inverting the oscillator signal 3, which is the oscillation output signal of the oscillator circuit 2, a second delay element D2 (node S11), to which the output of the fourth inverter INV4 is input, for the purpose of delaying the output thereof, a fifth inverter INV5 for inverting the output of the second delay element D2, a sixth inverter INV6 for inverting the output of the fifth inverter INV5, a second NAND logic circuit NA2, to which the output of the fourth inverter INV4 and the output of the second delay element D2 are input, a seventh inverter INV7 for inverting the output of the second NAND logic circuit NA2, a second switching means, connected for switching between the output of the sixth inverter INV6 (node S12) and a node S13, which is controlled by the outputs from a fifth NAND logic circuit NA5 and an eighth inverter INV8, and which is formed by the sixth NMOS transistor N6 and a second PMOS transistor P2 that are connected in parallel with each other, a third capacitance C3, one end of which is connected to the node S13 and the other end of which is connected to the node S14, a fourth capacitance C4, one end of which is connected to the output of the seventh inverter INV7 (node S15), a seventh NMOS transistor N7, the source and gate of which are connected to a power supply VDD, and the drain of which is connected to the other end of the third capacitance C3 (node S14), an eighth NMOS transistor N8, the source of which is connected to a power supply VDD, the drain of which is connected to the node S14, and the gate of which is connected to the node S4, a ninth NMOS transistor N9, the source of which is connected to the node S14, the drain of which is connected to a node S16, and the gate of which is connected to the node S4, a tenth NMOS transistor N10, the source of which is connected to the node S14, the drain of which is connected to the boosted-up voltage line VBOOT, and the gate of which is connected to the node S16, a third NAND logic circuit NA3, to which are input the oscillator signal 3, which is the oscillation output signal of the oscillator circuit 2, and the output of the second delay element D2, a fourth NAND logic circuit NA4, to which are input the output /3 of the fourth inverter INV4 and the output of the first delay element D1, a fifth NAND logic circuit NA5, to which are input the output of the third NAND logic circuit NA3 (node S21) and the output of the fourth NAND logic circuit NA4 (node S22), the output of the fifth NAND logic circuit NA5 being connected to the gates of the first and second PMOS transistors P1 and P2, an eighth inverter INV8 for inverting the output of the fifth NAND logic circuit NA5, the output of the eighth inverter being connected to the gates of the first and sixth NMOS transistors N1 and N6, and an eleventh NMOS transistor N11, the source of which is connected to the node S3, the drain of which is connected to the node S13, and the gate of which is connected to the output of the fifth NAND logic circuit NA5 (node S23).

It is further possible to implement the eleventh NMOS transistor N11 as a circuit that uses a p-channel MOS transistor, or a combination of an n-channel MOS transistor and a p-channel MOS transistor.

The operation of the stepped-up voltage generating circuit 4 shown in FIG. 2 is described below, with reference to signal waveforms.

Figure 3:
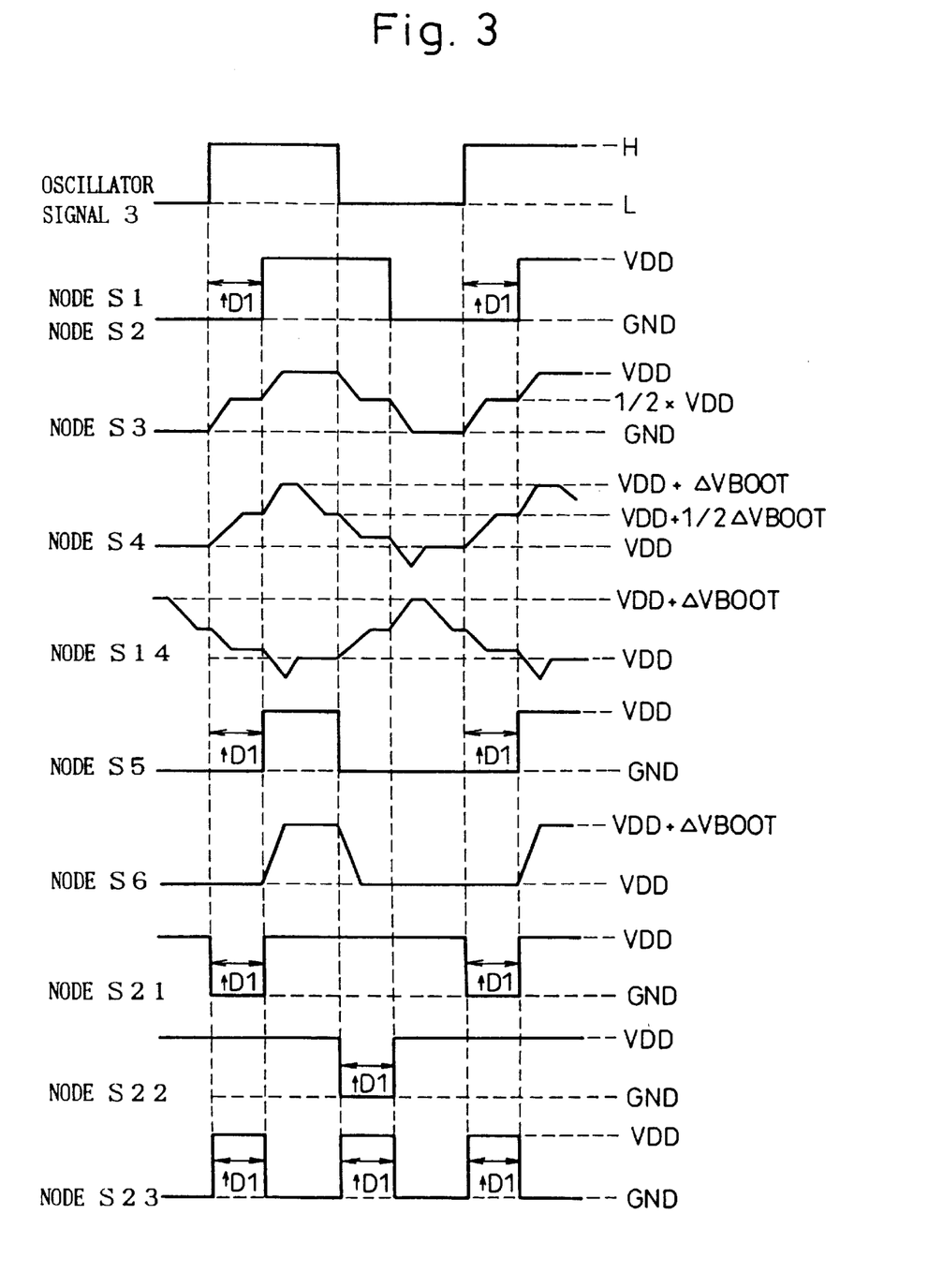
FIG. 3 is a set of potential waveform diagrams of various nodes in the first voltage boosting circuit of a stepped-up voltage generating circuit according to the first embodiment of the present invention.

FIG. 3 is a set of potential waveforms at various nodes in the first voltage boosting circuit 5a of the stepped-up voltage generating circuit 4 according to an embodiment of the present invention.

As shown in FIG. 3, when the oscillator signal 3 is at the low level (L), because the node S14, which is at the gate voltage of the NMOS transistor N3 and the NMOS transistor N4 is at a voltage of (VDD+ΔVBOOT), the NMOS transistors N3 and N4 are in the on condition at this time, so that the nodes S4 and S6 are at the voltage VDD.

When the oscillator signal 3 changes from the low level to the high level (H), during the delay time tD1 of the delay element D2, the output (node S21) of the NAND logic circuit NA3 is at the low level, the output (node S23) of the NAND logic circuit NA5 is at the high level, and the NMOS transistor N11 is in the on condition, so that node S3 at ground level and the node S13 at the voltage VDD are set to the same potential. Under these conditions if the capacitance C1 is equal to the capacitance C3, the potential at the nodes S3 and S13 is ½ VDD, and the node S4, which is the other end of the capacitance C1, which is in the floating condition, changes by the amount ½Δ VBOOT, according to the law of stored charges.

Thereafter, because the output (node S23) of the NAND logic circuit NA5 changes to the low level with the delay time tD1 of the delay element D1, the switching circuit that is formed by the NMOS transistor N1 and the PMOS transistor P1 changes to the on condition, capacitance C1 is charged, the voltage on the node S3 changes from ½ VDD to VDD, and the node S4, which is the other end of the capacitance C1 in the floating condition, changes by just the amount ½Δ VBOOT.

When the above occurs, the capacitance C2 is also charged, the voltage on the node S5 changing from ground to the voltage VDD, and the node S6, which is the other end of the capacitance C2 that is in the floating condition, changing by just the amount Δ VBOOT.

That is, by the oscillator signal 3 changing from the low level to the high level, there is a change in the potentials at nodes S4 and S6 ofΔVBOOT. Thus, the NMOS transistor N5 changes to the on condition, and a charge is transferred from node S4 to the stepped-up voltage line VBOOT, so that the stepped-up voltage line VBOOT is biased to the boosted voltage VBOOT.

When the oscillator signal 3 changes from the low level to the high level, the output (node S12) of the inverter INV6 and the output (node S15) of the inverter INV7 change from the voltage VDD to the ground level, with the delay tD1 of the delay element D1. When this occurs, the output (node S23) of the NAND logic circuit NA5 changes to the low level and the switching circuit formed by the NMOS transistor N6 an the PMOS transistor P2 changes to the on condition, the result being that the voltage on the capacitance C3 changes from ½ VDD to the ground level, and, because the node S16 is in the floating condition, that node S16 changes by an amount Δ VBOOT from the voltage (VDD+Δ VBOOT) to the voltage VDD.

In an internal voltage boosting circuit configured as described above, by repeating the voltage waveforms at the various nodes, the internal stepped-up voltage VBOOT is generated.

The voltage boosting operation and voltages at various nodes in the second voltage boosting circuit 5b, with the exception of reversed phases with respect to those of the first voltage boosting circuit 5a, are the same, and are therefore not explicitly described herein.

As described in detail below, whereas in an internal voltage boosting circuit according to the prior art after charging one end of a voltage boosting capacitance from ground to the power supply voltage to achieve a voltage boosting, in order to prepare for the next voltage boosting operation, the end of the voltage boosting capacitance is returned to the ground potential, in the internal voltage boosting circuit according to the present invention, in order to prepare for the next voltage boosting operation one end of a voltage boosting capacitor is connected to one end of a voltage boosting capacitance of another voltage boosting circuit that operates with a 180-degree phase difference from the other voltage boosting circuit, ½ of the accumulated charge be re-used, after which the capacitance is connected to ground to return it to the ground potential, thereby reducing the current consumed in charging and discharging of the voltage boosting capacitances to one-half that required in the past.

What is claimed is:

1. An internal voltage boosting circuit comprising:
   a plurality of voltage boosting circuits, voltage boosting capacitances provided in each of said voltage boosting circuits being charged so as to perform voltage boosting operations;
   wherein a charge that is accumulated in a first voltage boosting capacitance in a first voltage boosting circuit is used in the charging of a second voltage boosting capacitance provided in a second voltage boosting circuit, and in vice versa;
   wherein the first voltage boosting circuit and the second voltage boosting circuit are connected in parallel; and
   wherein driving signals of the first voltage boosting circuit and the second voltage boosting circuit oscillate between ground potential and VDD.

2. An internal voltage boosting circuit according to claim 1, wherein said first and said second voltage boosting circuits are driven respectively with a phase difference of 180 degrees from each other.

3. An internal voltage boosting circuit according to claim 1, wherein a one end terminal of said first voltage boosting capacitance is connected to one end of terminal of said second voltage boosting capacitance, via a switching means.

4. An internal voltage boosting circuit according to claim 1, wherein at least a part of charge accumulated in one of said first and second voltage boosting capacitances is transferred into an opposite voltage boosting capacitance in response to an operation of said switching means.

5. An internal voltage boosting circuit according to claim 4, wherein said switching means is driven with an oscillating signal input into said first and second voltage boosting circuit.

6. An internal voltage boosting circuit comprising:
   a plurality of voltage boosting means having voltage boosting capacitances provided in each of said voltage boosting means being charged respectively to perform voltage boosting operations;
   a boosted voltage generating means having a switching means connecting said voltage boosting means;
   wherein said switching means is configured to perform the next voltage boosting by having one end of a voltage boosting capacitance of one of a first voltage boosting means connected to one end of a second voltage boosting capacitance of a second voltage boosting means having an operating phase different than that of said first voltage boosting means by 180 degrees;
   wherein an accumulated charge on either one of said ends is re-used and subsequently returned to ground potential, thereby boosting up the voltage to a prescribed value;
   wherein the first voltage boosting means and the second voltage boosting means are connected in parallel; and
   wherein driving signals of the first voltage boosting means and the second voltage boosting means oscillate between ground potential and VDD.

7. An internal voltage boosting circuit comprising an oscillator circuit to which is input an oscillator control signal and which generates a signal having a prescribed frequency, and an internal boosted-up voltage generating circuit which inputs an oscillation signal output of said oscillator circuit and outputs a prescribed boosted-up voltage, said internal boosted voltage generating circuit comprising:
   a first delay element, to which an oscillator signal output by said oscillator circuit is input, for the purpose of delaying the output thereof;

a first inverter for inverting the output of said first delay element;

a second inverter for inverting the output of said first inverter;

a first NAND logic circuit, to which said oscillator signal, which is the output of said oscillator circuit, and the output of said first delay element are input;

a third inverter for inverting the output of said first NAND logic circuit;

a first switching means, one end of which is connected to the output of said second inverter, and which comprises a first NMOS transistor and a first PMOS transistor connected in parallel with each other;

a first capacitance, one end of which is connected to the other end of said first switching means;

a second capacitance, one end of which is connected to the output of said third inverter;

a second NMOS transistor, the source and gate of which are connected to a power supply, and the drain of which is connected to the other end of said first capacitance;

a third NMOS transistor, the source of which is connected to a power supply, the drain of which is connected to the other end of said first capacitance, and the gate of which is connected to the other end of a third capacitance;

a fourth NMOS transistor, the source of which is connected to the other end of the first capacitance, the drain of which is connected to a boosted-up voltage line, and the gate of which is connected to the other end of said second capacitance;

a fifth NMOS transistor, the source of which is connected to the other end of said first capacitance, the drain of which is connected to the boosting voltage line, and the gate of which is connected to the other end of said second capacitance;

a fourth inverter for inverting the oscillator signal, which is the oscillation output signal of said oscillator circuit;

a second delay element, to which the output of said fourth inverter is input, for the purpose of delaying the output thereof;

a fifth inverter for inverting the output of said second delay element;

a sixth inverter for inverting the output of said fifth inverter;

a second NAND logic circuit, to which the output of said fourth inverter and the output of said second delay element are input;

a seventh inverter for inverting the output of said second NAND logic circuit;

a second switching means, one end of which is connected to the output of said sixth inverter, and which comprises a sixth NMOS transistor and a second PMOS transistor connected in parallel with each other;

a third capacitance, one end of which is connected to the other end of said second switching means;

a fourth capacitance, one end of which is connected to the output of said seventh inverter;

a seventh NMOS transistor, the source and gate of which are connected to a power supply, and the drain of which is connected to the other end of said third capacitance;

an eighth NMOS transistor, the source of which is connected to a power supply, the drain of which is connected to the other end of said third capacitance, and the gate of which is connected to the other end of said first capacitance;

a ninth NMOS transistor, the source of which is connected to the other end of said third capacitance, the drain of which is connected to a boosted-up voltage line, and the gate of which is connected to the other end of said fourth capacitance;

a tenth NMOS transistor, the source of which is connected to the other end of said third capacitance, the drain of which is connected to the boosting voltage line, and the gate of which is connected to the other end of said fourth capacitance;

a third NAND logic circuit, to which are input said oscillator signal, which is an output signal of said oscillator circuit, and the output of said second delay element;

a fourth NAND logic circuit, to which are input the output of said fourth inverter and the output of said first delay element;

a fifth NAND logic circuit, to which are input the output of said third NAND logic circuit and the output of said fourth NAND logic circuit, the output of said fifth NAND logic circuit being connected to the gates of said first and second PMOS transistors;

an eighth inverter for inverting the output of said fifth NAND logic circuit, the output of said eighth inverter being connected to the gates of said first and sixth NMOS transistors; and an eleventh NMOS transistor, the source of which is connected to one end of said first capacitance, the drain of which is connected to one end of said third capacitance, and the gate of which is connected to the output of said fifth NAND logic circuit.

8. An internal voltage boosting circuit comprising an oscillator circuit to which is input an oscillator control signal and which generates a signal having a prescribed frequency, and an internal boosted-up voltage generating circuit which inputs an oscillation signal output of said oscillator circuit and outputs a prescribed boosted-up voltage, said internal boosted voltage generating circuit comprising:

a first delay element, to which an oscillator signal output by said oscillator circuit is input, for the purpose of delaying the output thereof;

a first inverter for inverting the output of said first delay element;

a second inverter for inverting the output of said first inverter;

a first NAND logic circuit, to which said oscillator signal, which is the output of said oscillator circuit, and the output of said first delay element are input;

a third inverter for inverting the output of said first NAND logic circuit;

a first switching means, one end of which is connected to the output of said second inverter, and which comprises a first NMOS transistor and a first PMOS transistor connected in parallel with each other;

a first capacitance, one end of which is connected to the other end of said first switching means;

a second capacitance, one end of which is connected to the output of said third inverter;

a second NMOS transistor, the source and gate of which are connected to a power supply, and the drain of which is connected to the other end of said first capacitance;

a third NMOS transistor, the source of which is connected to a power supply, the drain of which is connected to the other end of said first capacitance, and the gate of which is connected to the other end of a third capacitance;

a fourth NMOS transistor, the source of which is connected to the other end of the first capacitance, the drain of which is connected to a boosted-up voltage line, and the gate of which is connected to the other end of said second capacitance;

a fifth NMOS transistor, the source of which is connected to the other end of said first capacitance, the drain of which is connected to the boosting voltage line, and the gate of which is connected to the other end of said second capacitance;

a fourth inverter for inverting the oscillator signal, which is the oscillation output signal of said oscillator circuit;

a second delay element, to which the output of said fourth inverter is input, for the purpose of delaying the output thereof;

a fifth inverter for inverting the output of said second delay element;

a sixth inverter for inverting the output of said fifth inverter;

a second NAND logic circuit, to which the output of said fourth inverter and the output of said second delay element are input;

a seventh inverter for inverting the output of said second NAND logic circuit;

a second switching means, one end of which is connected to the output of said sixth inverter, and which comprises a sixth NMOS transistor and a second PMOS transistor connected in parallel with each other;

a third capacitance, one end of which is connected to the other end of said second switching means;

a fourth capacitance, one end of which is connected to the output of said seventh inverter;

a seventh NMOS transistor, the source and gate of which are connected to a power supply, and the drain of which is connected to the other end of said third capacitance;

an eighth NMOS transistor, the source of which is connected to a power supply, the drain of which is connected to the other end of said third capacitance, and the gate of which is connected to the other end of said first capacitance;

a ninth NMOS transistor, the source of which is connected to the other end of said third capacitance, the drain of which is connected to a boosted-up voltage line, and the gate of which is connected to the other end of said fourth capacitance;

a tenth NMOS transistor, the source of which is connected to the other end of said third capacitance, the drain of which is connected to the boosting voltage line, and the gate of which is connected to the other end of said fourth capacitance;

a third NAND logic circuit, to which are input said oscillator signal, which is an output signal of said oscillator circuit, and the output of said second delay element;

a fourth NAND logic circuit, to which are input the output of said fourth inverter and the output of said first delay element;

a fifth NAND logic circuit, to which are input the output of said third NAND logic circuit and the output of said fourth NAND logic circuit, the output of said fifth NAND logic circuit being connected to the gates of said first and second PMOS transistors;

an eighth inverter for inverting the output of said fifth NAND logic circuit, the output of said eighth inverter being connected to the gates of said first and sixth NMOS transistors; and an eleventh NMOS transistor, the source of which is connected to one end of said first capacitance, the drain of which is connected to one end of said third capacitance, and the gate of which is connected to the output of said fifth NAND logic circuit;

wherein said eleventh NMOS transistor can be replaced with a p-channel MOS transistor, or a combination of an n-channel MOS transistor and a p-channel MOS transistor.

9. A semiconductor memory device comprising an internal voltage boosting circuit as claimed in any one of claim 1 through claim 8.

10. A portable apparatus having a semiconductor memory device comprising an internal voltage boosting circuit as claimed in any one of claim 1 through 8.

* * * * *

UNITED STATES PATENT AND TRADEMARK OFFICE
CERTIFICATE OF CORRECTION

PATENT NO. : 6,285,241 B1
DATED : September 4, 2001
INVENTOR(S) : Souichirou Yoshida It is certified that error appears in the above-identified patent and that said Letters Patent is hereby corrected as shown below:

Column 1,
Line 34, delete "INVL" insert -- INV1 --

Column 7,
Line 23, delete "ofΔVBOOT" insert -- of Δ VBOOT --

Signed and Sealed this

Fifth Day of March, 2002

*Attest:*

*Attesting Officer*

JAMES E. ROGAN
*Director of the United States Patent and Trademark Office*